United States Patent [19]

Sussman et al.

[11] Patent Number: 4,793,812
[45] Date of Patent: Dec. 27, 1988

[54] HAND HELD OPTICAL SCANNER FOR OMNI-FONT CHARACTER RECOGNITION

[75] Inventors: Michael Sussman, Winchester; Yair Kipman, Concord, both of Mass.

[73] Assignee: Xerox Corporation, Stamford, Conn.

[21] Appl. No.: 104,741

[22] Filed: Oct. 5, 1987

[51] Int. Cl.$^4$ ............................................. G09B 21/00
[52] U.S. Cl. .................................... 434/116; 235/472; 358/285; 358/293
[58] Field of Search ............... 434/116; 235/447, 454, 235/461, 472; 358/285, 293

[56] References Cited

U.S. PATENT DOCUMENTS

| | | | |
|---|---|---|---|
| 3,245,158 | 4/1966 | Schwartz | 35/35 |
| 3,318,996 | 5/1967 | Garfield et al. | 178/6.6 |
| 3,346,692 | 10/1967 | Garfield et al. | 178/6 |
| 3,512,129 | 5/1970 | Garfield | 340/146.3 |
| 3,541,248 | 11/1970 | Young | 178/6.6 |
| 3,874,097 | 4/1975 | Mauch et al. | 434/116 |
| 4,349,730 | 9/1982 | Pfeifer et al. | 235/472 |
| 4,375,916 | 3/1983 | Levine | 355/5 |
| 4,392,053 | 7/1983 | Bockholt | 235/472 |
| 4,523,235 | 6/1985 | Rajchman | 358/256 |
| 4,538,060 | 8/1985 | Sakai et al. | 235/472 |
| 4,544,842 | 10/1985 | Engemann et al. | 250/227 |
| 4,553,035 | 11/1985 | Malinsky et al. | 250/566 |
| 4,574,317 | 3/1986 | Scheible | 358/285 |
| 4,575,625 | 3/1986 | Knowles | 235/467 |
| 4,703,186 | 10/1987 | Nakayama | 235/472 |

OTHER PUBLICATIONS

Tandon, "Hand Operated Scanner", Xerox Disclosure Journal, vol. 9, No. 2, Mar./Apr. 1984, pp. 163-164.

Primary Examiner—Leo P. Picard
Attorney, Agent, or Firm—Robert A. Chittum

[57] ABSTRACT

A high resolution hand held scanner is disclosed for use with a character recognizing and voice synthesizing reading machine for the blind or print handicapped people. The components for scanning swaths of printed text from single sheets or bound pages of bound volumes are housed in an elongated, dust-tight carriage. A broad roller is rotatably mounted on one edge of the carriage and a split roller is rotatably mounted on an opposite edge. The roller axes are coplanar and parallel with each other, so that when the carriage is manually moved across a page to be scanned, a window in the carriage floor is maintained a predetermined distance therefrom and the rollers guide the carriage in a substantially straight line without need of guide rails. A strobed LED array provides the illumination for a 1728 element per inch CCD array via a Selfoc ® lens. Each four CCD elements are summed to synthesize over 400 pixels per inch resolution scanning, with each synthesized pixel having increased light gathering ability. A rotary encoder is belt coupled to the split roller to provide speed and scanning direction signals. Circuitry is provided for processing the CCD array output signals in accordance with the rotary encoder signals.

10 Claims, 5 Drawing Sheets

HAND HELD OPTICAL SCANNER FOR OMNI-FONT CHARACTER RECOGNITION

BACKGROUND OF THE INVENTION

1. Field of the Invention

This invention relates to hand held optical scanners for use in manual scanning printed text, independent of font type, and more particularly, to hand held optical scanners for use with a character recognizing and voice synthesizing reading machine to enable manual scanning by the blind or by the print handicapped for the purpose of converting substantially any printed text into synthesized human voice.

2. Description of the Prior Art

In order for a blind or visually impaired person to obtain the benefit of written or non-oral information, whether it be for education, entertainment, or an employer, the information must be in braille or orally presented either by a person or by a recording of an oral rendition. There is a tremendous cost advantage for schools, libraries and employers, if regular books, magazines, and other printed material could be used by the sight impaired, for the cost to reproduce them in braille or recorded sound is avoided, as well as the added cost for the extra storage space that would be required.

An existing reading machine for the blind requires that the visually impaired person take the printed material, such as a book, to the reading machine and place it opened face down on a fixed platen, one page at a time, so that the printed text thereon may be scanned, converted into video or digitized data, converted askew representation, and then converted to sound by a voice synthesizing system.

There are disadvantages of using a console type reading machine for the blind. It is centrally located requiring the printed material be brought to it and such reading machine takes up space whether in use or not. Also, the user must lift a bound volume of printed material after each page has been scanned, the page must be turned, and the next page in the bound volume realigned on the platen. Such manipulation of bound volumes of printed material is cumbersome for a visually impaired person, and the task of scanning the pages would be simpler if the bound volume could remain stationary and only the pages turned after they were scanned by small, compact hand held scanner.

Accordingly, this invention provides a small hand held scanner connected by flexible cable to a portable character recognizer and voice synthesizer, which may be conveniently stored when not in use, and taken to the particular location in the building that is closer to the usual location of the printed material to be used by the visually impaired person. Because the portable voice synthesizer is compact and does not require a relatively large fixed platen, it may be conveniently moved to temporary locations, such as, for example, hospitals and nursing homes. Further, these devices may be used by the sighted individuals who are print handicapped; that is, used by the illiterate, uneducated, or non-English speaking people.

To eliminate the fixed platen and enable a portable reading machine, a hand held scanner is required that is the subject of this invention. There are many hand held scanners known in the industry for producing hard copies of the scanned portions of the printed materials, for reading bar code symbols, and the like, but none are adapted for high image quality character recognition that is required for multi-font scanning in connection with a reading machine for the blind.

U.S. Pat. No. 3,541,248 to Young discloses a recording system which employs a hand held scanner and a recorder. A spot of light is moved across both the material to be copied by the scanner and a light sensitive medium by the recorder, with the scanning of the spots both being correlated to the movement of the scanner across the material to be recorded. This correlation is achieved by a light chopper or similar device which generates signals indicative of the rate of travel of the scanner across the material being scanned. Thus, the recording or reproduction of the image scanned is independent of the speed at which the scanner is moved across the original image.

U.S. Pat. No. 4,553,035 to Malinsky et al discloses a data acquisition control system for a hand held, manually moved reader comprising an optical character recognition system (OCR) having a head for scanning characters and an adjacent head for monitoring the position of points of a reticle normal to a rail contained on a manually positioned base. The reticle is disposed on the base adjacent the rail. When the base is positioned adjacent a row of characters to be scanned, the heads are guided by the rail as they are manually moved, one head scans the characters and the other scans the reticle. Every time the head moves a predetermined distance, it is caused to output data relating to the series of characters scanned.

U.S. Pat. No. 4,574,317 to Scheible discloses a hand scannable portable copier and method comprising a solid state optical scanner array and a thermal printhead array in a pocket-sized housing. The scanning is done either with the help of a constant speed motor or manually. The system is also provided with a separate guide element to assist the user in scanning the original document in straight lines.

U.S. Pat. No. 4,523,235 to Rajchman discloses an electronic microcomputer apparatus using an electronic pen which scans a line of text manually and stores signals from optical sensors in a reading head of an electronic memory. A line of photosensors within the pen is oriented vertically so that each of the sensors sweep a horizontal line. A pair of positioning wheels, one for a writing end of the pen and one for a reading end of the pen, are used to insure correct relative positioning of the characters. The manual sweep can proceed at any speed, since the horizontal location of the sensors is monitored by positioning wheels. One wheel guides the pen and has angular space marks which are optically detected to activate the counter which in turn addresses the memory.

U.S. Pat. No. 4,544,842 to Engemann et al discloses an arrangement of light conductors that are correlated with the sensor areas of an array of image sensors. The light conductors consist of glass wafers or fibers whose respective width or diameter corresponds to the width of a sensor area. The light conductors are joined to form a block having a top surface area which corresponds to the document to be scanned line by line by joint movement of a light source and the image sensor array.

U.S. Pat. No. 4,538,060 to Sakai et al discloses a hand held bar code reader having a reading sensor for converting optically readable information into an electrical signal by electronically scanning an image of optical information, such as a bar code. A detector is provided to detect the intensity of light incident on the information label on which the information is provided. Data indicative of the light intensity is used to determine a subsequent scanning period in such a manner that the scanning period of the reading sensor is shortened when the light intensity increases or vice versa. Since the decrease in the scanning period results in lower output voltage from the reading sensor, undesirable saturation in circuitry following the reading sensor is effectively prevented.

An article entitled "Hand Operated Scanner" by J. C. Tandon, Xerox Disclosure Journal, Vol. 9, No. 2, March/April, 1984, discloses a hand operated scanner comprising a manually movable head and a guide rail along which one end of the head may be moved. The portion of the head extending beyond the guide rail contains a gradient index fiber lens and sensor array for scanning documents. When used, the scanner is placed on the document to be scanned so that the sensor array may scan the desired part of the document to be read thereby as the head is manually moved along the guide rail.

U.S. Pat. No. 4,375,916 to Levine discloses a portable, detachable image reader and memory for use with a photocopy machine to read and temporarily store video images of documents to be copied. A visual display incorporated in the portable reader enables the user to check the legibility and reproducability of the document scanned so that the user may erase an improper or incomplete image and make another while the document to be copied is still available to the portable reader. In addition, means for sampling different spatial portions of the video image generated by the portable reader which is less than the image scanned, indicates an estimate of the reproducability of the video image produced by the image reader.

U.S. Pat. No. 3,245,158 to Schwartz discloses a hand held scanner for the blind having a rotatably adjustable variable slot which may be sonically adjusted about a fixed partition within the scanner, so that light from a light source in the scanner and directed to the document to be read is reflected into the variable slot. The slot is manually positioned in accordance with tones produced by photosensors on each side of the partition to match the height of the printed characters to be scanned. This is accomplished when the variable slot is adjusted so that the partition is exactly equidistant of the top and bottom of the characters to be scanned.

U.S. Pat. No. 4,575,625 to Knowles discloses a portable hand held laser scanner system located within a compact housing. The laser is operative when triggered by the user to produce a laser beam which exits the housing to scan a target such as a bar code symbol located adjacent thereto and to receive light reflected from the target. A computer in the housing is arranged for decoding the reflected signal. The computer is arranged to control and override the operation of the laser when the amount of laser light produced within a predetermined period time reaches a threshold value that would be unsafe for the user.

U.S. Pat. No. 3,318,996 to Garfield et al discloses a hand held scanner connected to a reproducing machine. The scanner has a synchronizing roll mounted on one side thereof which frictionally engages the document to be copied and reproduced. The roll controls a relay whose contacts control a stepping motor. The stepping motor provides the power to drive rolls which move paper through the reproducing machine in synchronism with the speed of the manual movement of the scanner.

U.S. Pat. No. 3,346,692 to Garfield et al discloses a hand held scanner and reproducing machine having circuitry to assure movement of the recording material through the reproducing machine is in proportion to the movement of the reading head prior to recording and to prevent recording unless it is moved in synchronism with the scanning head.

U.S. Pat. No. 3,512,129 to Garfield discloses a hand held scanning device for selectively reading, character recognition apparatus connected to the scanning device, and character reproducing machine such as a typewriter connected to receive the output signal from the character recognition apparatus and reproduce the same in printed form. In addition to having the scanned material retyped by the typewriter, this combination can be used to edit and verify the accuracy of the reproduced copy.

SUMMARY OF THE INVENTION

It is an object of this invention to provide a hand held optical scanner having a superior scanning speed, range, and image quality.

It is another object of this invention to provide a hand held optical scanner adapted to compensate for variable light integration time using strobe light emitting diodes (LEDs) in order to achieve increased scanning speed range and image quality.

It is still another object of this invention to provide a hand held optical scanner having a compact design, high resolution, and wide field of view through a design that combines a Selfoc ® lens, a focusing mechanism, window, LED, and charge couple device (CCD).

It is yet another object of this invention to provide a hand held optical scanner having a pixel summing capability to obtain enhanced light sensitivity from a standard CCD array with rod-lens optics.

It is a further object of this invention to provide a hand held optical scanner having a roller carriage design which enable straight line movement without the use of guide rails.

It is still a further object of this invention to provide a hand held optical scanner having a slow scan image normalization by the use of a rotary optical encoder coupled to a roller carriage and by strobing the CCD array input signals.

It is yet a further object of this invention to provide a hand held optical scanner having the ability to scan bound material without requiring contact of the page to be scanned with the scanner's optics.

In the present invention, a hand held optical scanner having a compact design is disclosed. To insure straight line motion, either forward or backward, as the user moves the scanner across a document, a broad roller is positioned along one edge of its entire length. A second split roller is positioned at the scanner edge opposite to the one with the broad roller, with both roller axes being parallel with each other. The split roller is coupled to a rotary optical encoder which provides speed and scanning direction information. An optical window is in the bottom of the scanner closely adjacent to the edge having the split roller. This feature enables the scanning of bound material close to the binding. Alternate pages are scanned by flipping the scanner, so that the viewing edge of the scanner is always facing the binding of the bound material.

A standard 1728 element linear CCD array is employed as the image sensor for the scanner. Electronic images are obtained by raster scanning. The CCD receives images from a Selfoc ® lens. An array of 16 LED chips is used for page elimination and the Selfoc ® lens serve to focus the illumination in a uniform line at the focus of the scanner. A transparent plastic window protects the optical system from dust and scratches by enabling a dust-tight scanner housing therefor.

To obtain a 423 spots per inch (SPI) or about 17 spots or pixels per millimeter image sampling frequency in the vertical or fast scan direction from the 1728 CCD array without sacrificing light gathering ability, an analog addition of groups of every four adjacent CCD elements is performed by modifying the normal timing sequence of the reset clock pulses to the CCD array.

Horizontal motion or slow scan direction of the hand held optical scanner is controlled by the user. Since horizontal motion of the scanner provides one dimension of the raster scan and since user controlled motion is non-uniform, a means is provided for controlling scan line acquisition based on horizontal distance traversed. Equal fast and slow scan resolution, referred to as speed normalization, is provided by the rotary encoder which is geared to the split roller. The encoder pulses are processed electronically to produce 423 start of scan pulses per inch (25 mm) of scanner horizontal travel across the page. The start of scan pulses are fed to the shift input of the CCD array, so that each pulse causes a vertical scan line of 423 spots to be acquired. Due to the slow scan normalization technique, the time between shift pulses varies with the speed of the scanner across the page. The resulting variable integration time causes the scanners sensitivity to light to vary as the inverse of speed. A stobotic exposure control compensates for this effect. At each start of pulse, the LED array is flashed or energized for approximately 450 microseconds. Afterwards, the scanner's field of view is darkened until the next start of pulse occurs. Thus, the scanner response to the illuminated page is made independent of horizontal speed.

The foregoing features and other objects will become apparent from a reading of the following specification in connection with the drawings, wherein like parts have the same index numerals.

DESCRIPTION OF THE PREFERRED EMBODIMENT

Figure 1:
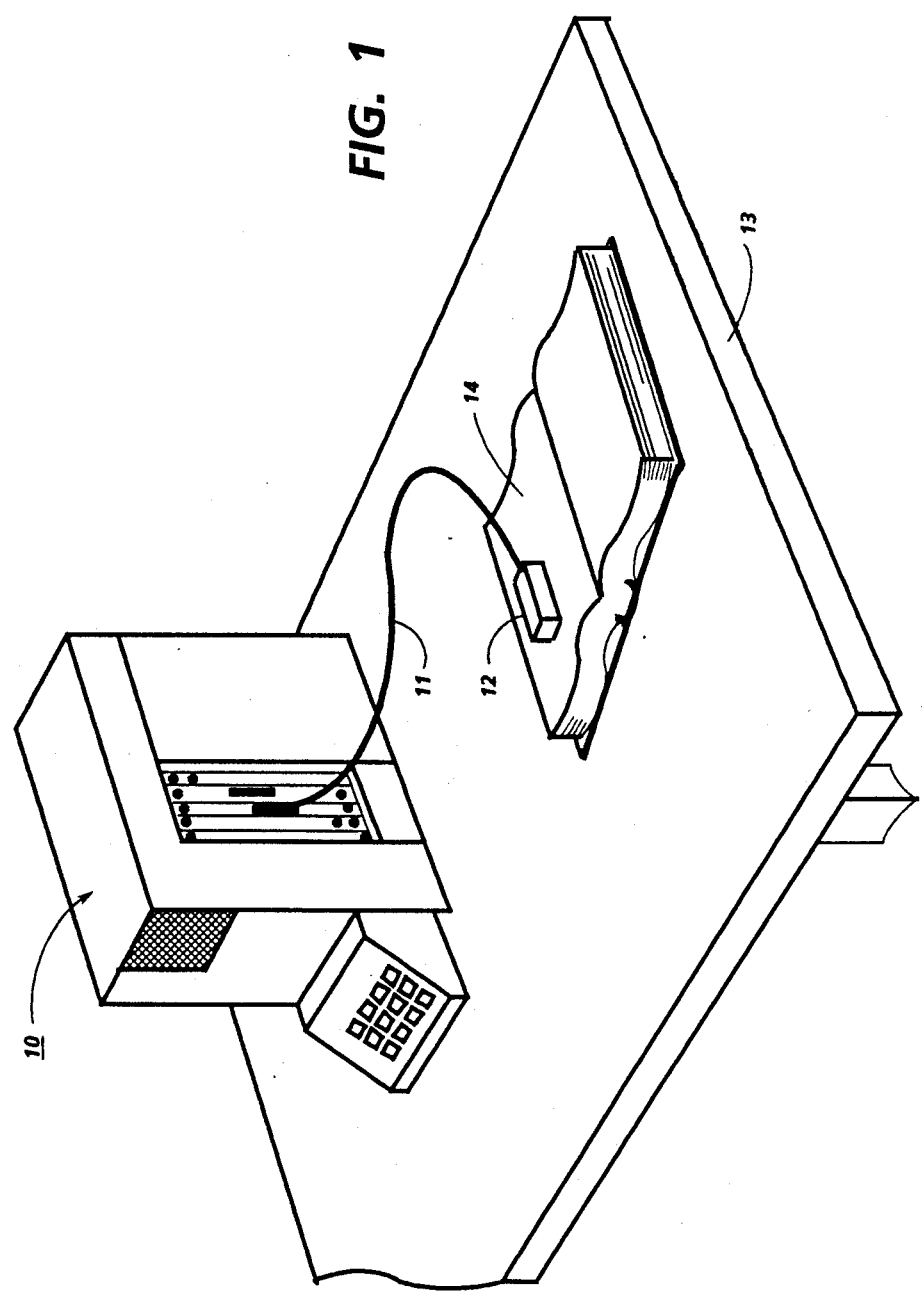
FIG. 1 is an isometric, schematic representation of a portable, desk top reading machine for the blind or print handicapped with the hand held optical scanner of the present invention resting on a page of bound material to be read.

In FIG. 1, a portable reading machine 10 for the blind or print handicapped persons is depicted resting on a table 13 and having the hand held optical scanner 12 of the present invention connected thereto by flexible cable 11. The scanner converts font independent printed matter into digitized data signals and transmits them to the reading machine. The reading machine converts the digitized data signals into askew representation and then into human synthesized voice. As more fully discussed with reference to FIG. 2, the scanner 12 is placed on a page of bound printed material 14 and manually moved in a horizontal direction relative to the bound material's vertical binding by the user.

Figure 2:
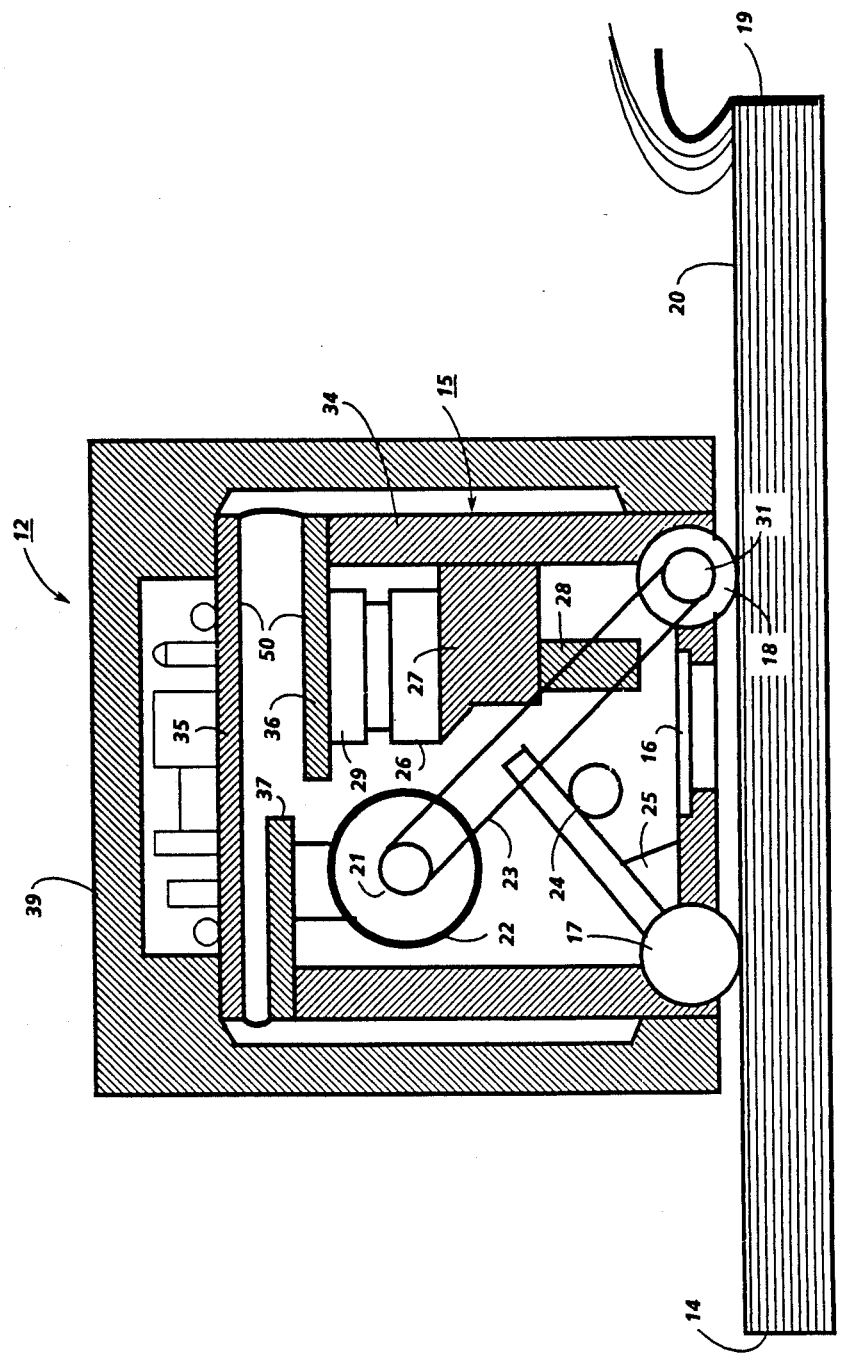
FIG. 2 is an enlarged cross-sectional schematic view of the hand held scanner of FIG. 1.

An enlarged schematic representation of a cross sectional view of the hand held scanner 12 is shown in FIG. 2. It is a compact scanning system comprising a light emitting diode array 24 for illumination, linear CCD array 26 which receives images from a linear array of graded index glass fibers 28 and rotary encoder 22 all housed in a dust-tight carriage 15 having approximate overall dimensions of 2.5 inches (6.4 cm) long, 1.2 inches (3.1 cm) wide, and 1.4 inches (3.6 cm) high. The scanning system resolves 423 spi and has a field of view of one inch or 2.54 cm. The carriage rides across the page on parallel rollers 17, 18 mounted along the length of the carriage on opposite edges thereof. These rollers are constructed from a resilient material such as, for example, polyurethane. Roller 17 is a broad roller extending substantially across the full length of one edge of the scanner. This broad roller insures straight line motion as the user manually guides the carriage with the scanning system across a page. The second roller 18 is split into two parts, each part coaxially mounted on opposite ends of the carriage. The split roller 18 is coupled to a rotary optical encoder 22 by a belt 23 and pulleys 21 and 31. This provides speed information needed to accomplish the proper timing of the horizontal line scans. The encoder also provides direction information to the scanning system. An optical window 16 is located adjacent and parallel to the axis of rotation of the split roller 18, so that the information at the edge of a page 20 next to the binding 19 of a bound volume of printed material 14 can be scanned.

In the preferred embodiment, this window is of a light passing or transparent plastic material which protects the optical system from light obstruction by dust and/or scratches. Optionally, it may be coated to further resist abrasion and/or provide an optical filter to enhance the performance of CCD array. The optical window center has been placed as close to the edge of the scanner as possible, approximately 0.27 inches or 6.2 millimeters. This feature enables the scanning of bound material close to the binding without interference from the carriage body. Alternate pages on opposite sides of the binding are scanned by flipping the carriage on the page so that the viewing edge with the optical window is near the binding. The optical window is positioned as close to the split rollers 18 as practical. In the preferred embodiment, the distance from the center of the window to the split roller axis is about 0.15 inches or 4 millimeters. In addition to straight line tracking of the carriage, the two rollers help insure that the page to be scanned is held within the focal plane of the optics.

A 1728 element linear CCD array marketed by Toshiba America, Inc. as TCD101AC is employed as the image sensor for the hand held scanner. The CCD array 26 is a standard product manufactured in volume for facsimile scanning systems by Toshiba. Electronic images are obtained from the scanner by raster scanning of a swath of information. With reference to a scanned swath, the vertical scanning is accomplished by clocking of the linear CCD array. By convention, the CCD array scan is referred to as vertical or the fast scan direction. The horizontal scanning is accomplished by manual movement of the carriage by the user, so that the carriage rides on its rollers horizontally across the page and in a direction generally parallel with the lines of printed text. This horizontal scanning is generally referred to as the slow scanning direction.

The CCD array receives images from a lens 28 formed from a linear array of graded index glass fibers. This lens 28 is manufactured by the Nippon Sheet Glass Company under the trade name Selfoc ®. The image focused at the CCD array is an erect 1:1 replica of a 26 mm long swath through the object. The particular Selfoc ® lens employed in the scanner, the SLA 20, has a total conjugate distance of 16.7 mm, and an f-number of 1.0. The short conjugate of this lens results in a very compact optical arrangement, while the small f-number minimizes illumination requirements.

The focusing properties of the Selfoc ® lens lead to a simple mechanism for alignment of the optical system. In a case where the distances from the center of the lens to the image and object planes (vertex distances) are equal, but exceed the total conjugate, the Selfoc ® lens shows little performance degradation. The CCD array 26 is mounted on circuit board 50, discussed later, and is adjustably fixed in place on a plastic holder 27 which is integrally formed with a sidewall 34 of the scanner carriage 15. When the circuit board is removably attached to the carriage, it is parallel to the carriage window 16, the surface of the page to be scanned (object plane), and covers the top of the carriage. This enables the CCD array to be precisely located a predetermined distance from the object plane. The Selfoc ® lens 28 is bonded onto an adjustable plastic frame member (not shown), and attached to holder 27 located below the CCD array. The frame member permits lens adjustment up and down in a direction normal to the object plane by means such as, for example, screws. The lens is adjusted for equal object and image vertex distance. This arrangement avoids tolerance problems with the actual lens height which varies in manufacture from lens to lens.

Figure 5:
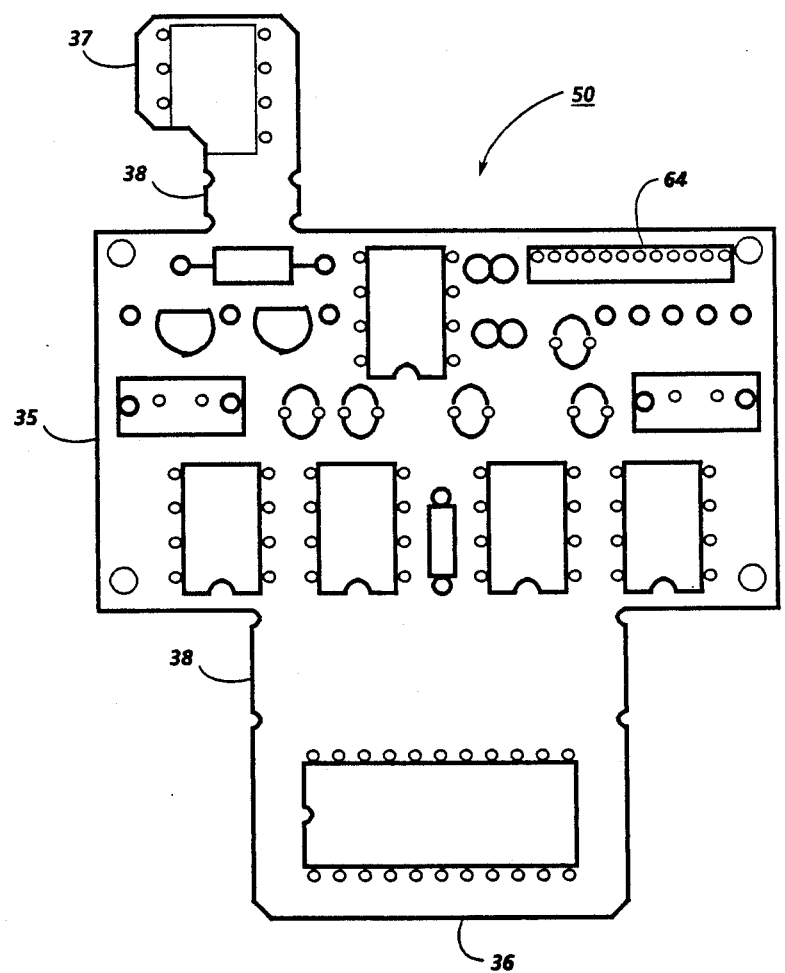
FIG. 5 is an enlarged plan view of the hand held scanner board.

The circuit board 50, shown in an enlarged, preassembled plan view in FIG. 5, has a main portion 35 that is rectangular in shape and has planar extensions 36, 37 from the opposite longer sides of the main portion. The larger extension 36 is for mounting the CCD array via socket 29 (shown in FIG. 2) and the smaller extension 37 is for mounting the rotary encoder 22. The part 38 of the extensions which connect to the main portion of the circuit board are flexible. These flexible portions are sometimes referred to as "flex tails". When the circuit board 50 is fully assembled, the extensions 36, 37 are folded under the main portion 35 thereof about the flex tails 38 and made to lie spaced from and parallel to the bottom side of the circuit board, so that a very compact assembly is provided. In this state, the circuit board is removably attached to the top of the carriage by, for example, screws (not shown), with the CCD array lying on the holder 27. The cover 39 (see FIG. 2), is a plastic housing which encloses all but the carriage bottom wall having the window and rollers 17, 18. This cover is removably and sealingly installed over the circuit board and moved to snap in place near the carriage bottom wall to tightly seal the interior of the carriage, including the circuit board. Electrical cable 11 plugs into pin receptacles 64 of the circuit board and sealingly penetrates the cover 39.

An array of 16 light emitting diode chips (LEDs) is used for page illumination. The LED array 24 is purchased as a custom part integrated with a cylindrical lens sold by Stanley Electric Company of Japan under part number BU4669LE. The array requires 10V dc and has a LED spectral peak wavelength of 660 nm, a spectral line half width of 30 nm with an illumination intensity on the document or page to be scanned of 800 Lumens per square meter. The active or lit length is 26 mm. The associated cylindrical lens serves to focus the illumination in a uniform narrow line at the focus of the hand held scanner on the page being scanned. In the preferred embodiment, a red LED illumination is used which has a narrow spectrum that helps to eliminate MTF degradation due to the large chromatic aberration characteristic of the Selfoc ® lens. The LED array is mounted on a ramp 25 and has means for angular adjustment (not shown) to achieve proper directionality of the illumination and is rugged and simple to control electronically.

A 400 spots per inch minimum image sampling frequency is deemed optimal for an optical character recognition application for input to a reading machine for the blind. Since the page is imaged 1:1 onto the 25.9 centimeter long CCD array, a 1694 spots per inch resolution would normally be obtained. Discarding three of every four pixels or spots would result in the proper resolution, but the light gathering capacity of the scanner would be inadequate for use as an LED illuminator in this case. This is because of the small area of individual pixels. 400 element, CCD arrays with large pixels that have an overall length of 2.54 cm are not available at commercial prices. Accordingly, a pixel summing technique is used to synthesize a 423 spots per inch resolution from the 1728 commercially available spot array without sacrificing light gathering ability. The analog addition of groups of four adjacent pixels is performed inside of the Toshiba CCD array by modifying the normal timing sequence of reset clock pulses to the array.

Figure 3:
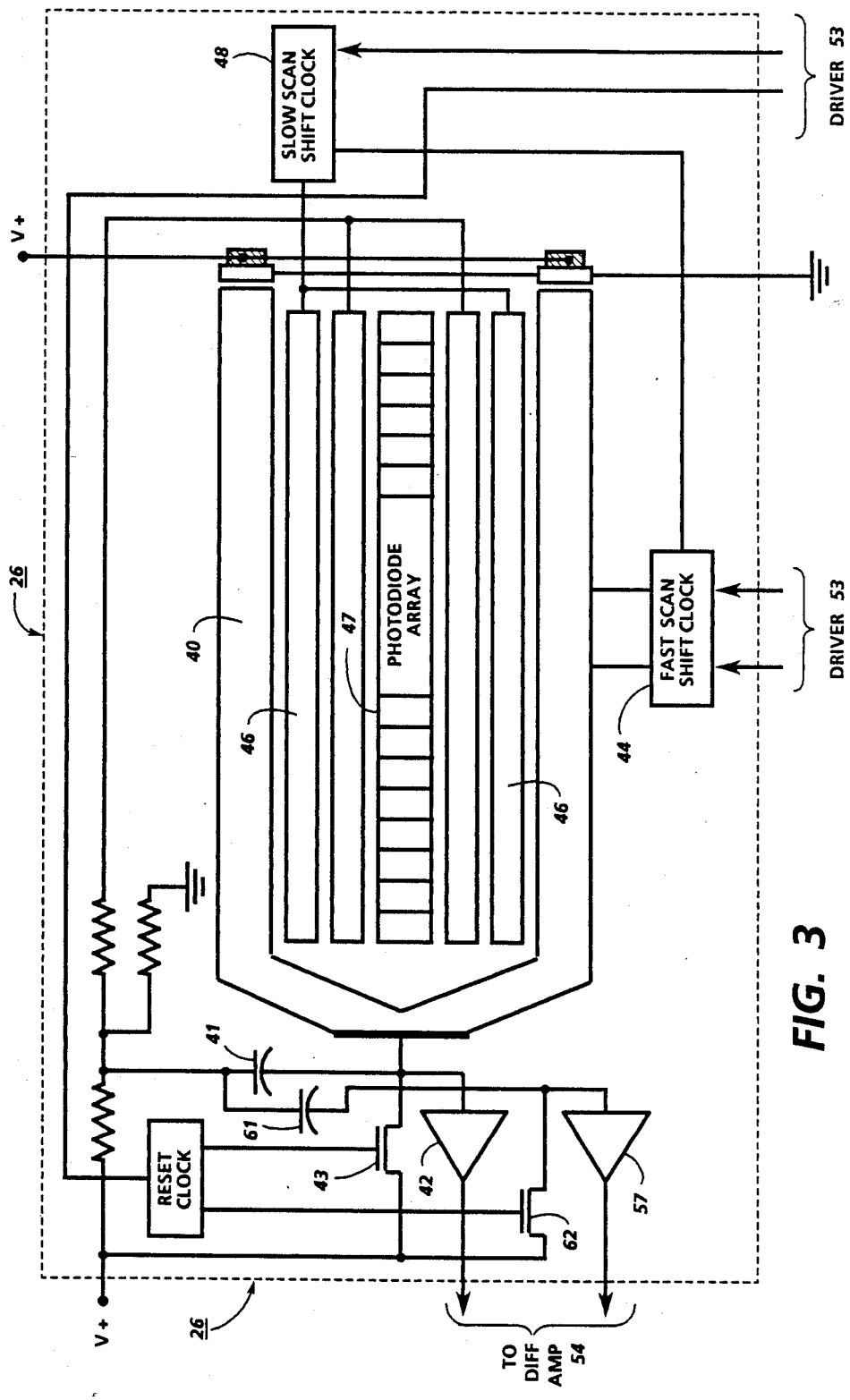
FIG. 3 is a circuit diagram for the CCD array.

Referring to FIG. 3, the CCD array 26, TCD101 by Toshiba, uses a CCD analog shift register 40 to serially access packets of signal charge accumulated from a photodiode array 47. As each charge packet is clocked out of the register, the signal charge flows into a capacitor structure 41. The signal charge of each packet alters the capacitor voltage by $V=q/C$. The voltage change across the capacitor is then buffered by a two stage amplifier 42. A capacitor 61 and transistor 62, identical to capacitor 41 and reset transistor 43, together with two stage amplifier 57, identical to amplifier 42, are provided as a noise and offset reference for signal correction to differential amplifier 54. To detect the signal charge of the next packet, the capacitor voltage is usually reinstated by switching on a reset transistor 43. The reset clock pulses applied to the transistors are precisely timed in relation to the CCD fast scan shift clock 44.

Pixel summing is accomplished by supplying one reset clock pulse for every four signal charge packets shifted out of the register 40. This allows four pixels worth of charge to accumulate on the capacitor 41 before reset. The resulting video waveform has a stairstep shape (not shown). A sample/hold circuit 45 (see FIG. 4) is used to extract the maximum amplitude integrated from each group of four pixels.

Scanner motion is controlled by manipulation of the carriage 15 by the user. Since scanner horizontal motion provides one dimension of the swath raster scan, and since user controlled motion is non-uniform, a means must be provided for controlling the vertical CCD scan line acquisition based on horizontal distance traversed, so that the images produced by the scanner show no distortion due to tracking speed variations. This is hereinafter referred to as speed normalization. The speed normalization is accomplished by causing scan line acquisition to take place when a fixed distance (1/423rd of an inch or 0.06 mm) has been traversed by the scanner on its carriage. The rotary encoder 22 is geared to the split roller 18 by belt 23 via pulleys 21 and 31. The encoder pulses are processed electronically via interface circuit board 52 to produce 423 slow scan shift clock pulses per inch (or 16.67/mm) of scanner horizontal travel across the page. The slow scan shift clock pulses are fed to the CCD array shift gate 46, so that each pulse causes a fast scan line of 423 spots to be acquired. The clocking speed of the CCD array limits scanner speed to a maximum of 6 inches/second (152.4 mm/second) across the page. A lower limit on the scanner speed is about 0.1 inches or 2.54 mm per second due to mechanical vibration or jitter considerations. Whenever the scanner speed is below the lower limit of 0.1 inch/second, the clock generation circuit 55 reduces fast scan shift clock to 8 mS per phase, and "dummy" slow scan shift clock pulses are produced at 8 mS intervals. The LED remains extinguished. This is referred to as "standby mode".

The standby mode prevents problems of dark current saturation. By dark current saturation it is meant that carrier generation by thermal energy causes charge to be integrated on the storage electrode associated with each photodiode until the limit of dynamic range is reached causing a highly non-linear response for several subsequent line scans. Thus, when the scanner motion resumes after this condition is encountered, poor images are acquired.

The addition of this standby mode permits accurate acquisition of images even when the scanner motion is interrupted and restarted during a scanning pass. Such conditions of stop/start or other erratic motion are commonly encountered with some users, so that this standby mode is essential for high quality, accurate scanning and image digitization.

Whenever the scanner speed exceeds the upper limit of 6 inches/second, the clock generation circuit 55 produces slow scan shift clock pulses for every other encoder pulse only, thereby reducing slow scan resolution by one-half, up to a limit of 12 inches/second. Over 12 inches/second, slow scan resolution drops to ¼. Fast scan resolution is unaffected. This mode of operation provides graceful degradation of image acquisition under extreme conditions of acceleration of the scanner by a user. In addition, the user is given audible indication of conditions of under 0.1 inch/second, over 6 inch/second and over 12 inch/second (not shown).

The TCD101 CCD by Toshiba uses an array of photodiodes 47 to convert incident light to packets of charge, and stores these packets until a shift pulse is applied to bring them into the CCD analog shift register 40. Charge or light is integrated for the entire period between shift pulses. Due to the speed normalization technique described above, the time between shift pulses varies with the speed of the scanner across the page 20. The resulting variable integration time causes the scanner's sensitivity to light to vary as the inverse of speed. In order to compensate for this effect, a simple stroboscopic exposure control is implemented. The technique takes advantage of the fast response time of the LED array. At each start pulse, the LED array 24 is flashed or energized for approximately 450 microseconds. Afterwards, the scanner's field of view is darkened by de-energization of the LED array until the next slow scan shift clock or start pulse occurs. Thus, scanner response to the illuminated page is made independent of speed.

At the maximum scanner speed of 6 inches/second or 152.4 mm/second, the LED flashes merge so that the page is constantly illuminated. This condition assures maximum scanner sensitivity. Light leakage under the scanner in bright lighting conditions generates a negligible amount of charge at the minimum scan speed of 0.1 inches/second, because of the short gap distance between the window 16 and the surface of page 20.

Figure 4:
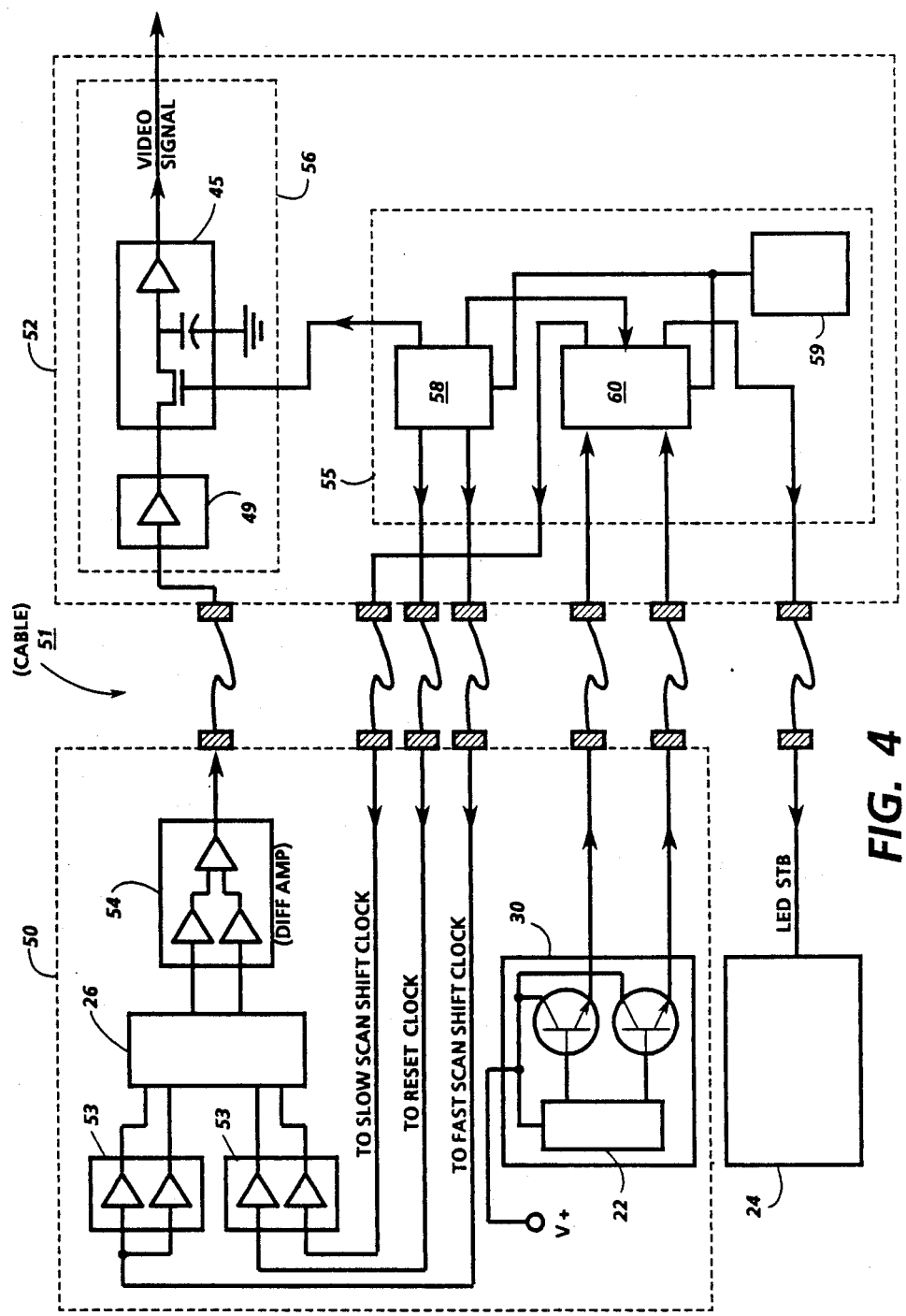
FIG. 4 is a circuit diagram for the hand held scanner board and interface board within the reading machine.

Referring to the scanner drive and signal processing circuits in FIG. 4, the hand held scanner electronics is implemented on two printed circuit boards 50, 52. The first printed circuit 50 contains clock drivers 53 for the CCD array 26, differential amplifier 54, and the encoder circuit 30. This printed circuit is linked to the second driver printed circuit 52 through a thin, flexible 12 conductor shielded cable 51, shown in FIG. 1 as flexible cable 11. The second printed circuit 52 contains clock generation circuitry 55 and simple signal processing circuitry 56.

The clock generation circuitry of the second printed circuit comprises two programmable logic arrays (PALs) 58, 60. The PALs are clocked by an 8 MHz master clock 59. The first PAL 58, in association with a delay line (not shown) produces a 500 nS 50% duty cycle fast scan shift clock pulse for the CCD array 26, as well as reset clock pulses of 60 nS duration and 1.0 uS interval to implement pixel summing. This PAL also produces an accurate sampling pulse for the sample/hold 45.

The second PAL 60, in association with two 14 bit binary ripple counters (not shown), generates the slow scan shift clock pulse 48. It does this by frequency-doubling quadrature encoder pulses from the encoder circuit 30 on printed circuit board (PCB) 50 and synchronizing the resulting signal to meet the timing requirements of the CCD. The encoder signals are also processed to produce a direction signal which indicates the direction of travel of the scanner carriage on the page. PAL 60 also generates the LED flash timing. The LED is held on for precisely 448 uS from the leading edge of the slow scan shift clock 48. Standby mode and too fast mode are also implemented by PAL 60, using a mode control state machine (not shown), and timing outputs of the ripple counters (not shown).

During stationary optical alignment of the scanner, a test jumper (not shown) is provided to disconnect the encoder outputs and substitute a constant start clock (not shown).

Signal processing of the scanning system depicted in FIG. 4 consists of a video buffer 49 and a sample/hold circuit 45 to extract the peak video envelope.

The hand held scanner of FIG. 2 is based on a unique arrangement of existing basic technologies and components such as CCD array, Selfoc ® lens, LED arrays, and rotary encoder to provide a unique high resolution optical scanner having speed normalization, illumination normalization by exposure control using a strobed LED array to compensate integration time, a pixel summing technique to synthesize a 423 element CCD array, and a mechanical arrangement of rollers and optics for access to print areas near the binding on books. In addition, the arrangement of rollers provide for straight line tracking of the carriage without need of external devices such as guide rails and the location of the optical system and carriage window enable reading of bound material, since the printed text can be read in the vicinity of the binding.

Although the foregoing illustrates the preferred embodiment of the present invention, other variations are possible. All such variations that would be obvious to one skilled in the art are intended to be included within the scope of this invention as claimed by the following claims.

We claim:

1. A hand held optical scanner to provide font independent character recognition for use in connection with a reading machine for the visually impaired or print handicapped people, comprising:

an elongated, dust-tight carriage having an internal cavity, a broad roller rotatably mounted along its length and at an outer edge thereof, a split roller rotatably mounted along an opposite outer edge, and a light passing window, said rollers having axes which are parallel with each other, so that, when the scanner is placed on a page of printed text to be scanned, the carriage rollers rest on the page and insure that the printed text is maintained within the focal plane of the scanner and so that, when the carriage is manually moved, the rollers guide the carriage in a substantially straight line;

a rotary encoder being mounted within the carriage cavity and coupled to the split roller for providing speed and scanning direction information signals;

a CCD array having a plurality of linear sensing elements and being positioned within the carriage cavity for employment as the image sensor, the CCD array being adapted to sum the output signals from each predetermined number of adjacent sensing elements to synthesize video or digitized data signals having a resolution of 400 or more pixels per inch with increased light gathering ability, and the CCD sensing elements being scanned in a direction parallel to the roller axes and normal to the direction of movement of the carriage;

a Selfoc ® lens being adjustably aligned adjacent the CCD array for providing light reflected through the carriage window from the page to be scanned to the CCD array;

a LED array being adjustably positioned within the carriage cavity for providing light to illuminate the portion of the page to be scanned through the carriage window; and circuit means for energizing the LED array in response to the information signals from the rotary encoder in order to compensate for the CCD array's variation in light sensitivity caused by non-uniform movement of the carriage as it is manually guided across the page to be scanned, and for processing the digitized data signals from the CCD in accordance with the rotary encoder information signals and producing output digitized data signals for transmittal to the reading machine for converting the data signals into synthesized human voice.

2. The scanner of claim 1, wherein the predetermined number of adjacent elements summed is four to produce 423 pixels per inch resolution.

3. The scanner of claim 2, wherein the circuit means process the rotary encoder speed information signals to produce 423 slow scan shift clock pulses per inch of horizontal movement by the scanner and each slow scan shift clock pulse causes a fast scan of 423 spots or pixels by the CCD array to be acquired and integrated over the entire period between slow scan shift clock pulses; and wherein the LED array is energized for a predetermined time period at each slow scan shift clock pulse and then deenergized until the next slow scan shift clock pulse occurs, so that the scanner response to the illuminated page is made independent of scanner speed.

4. The scanner of claim 3, wherein the circuit means further comprises: means to generate one reset clock pulse for every four serially acquired CCD pixels, so that four pixels worth of charge is accumulated in a capacitor from the CCD sensing elements before the next reset pulse; and a sample/hold circuit for extracting the maximum amplitude integrated from the capacitor for each group of four pixels, so that 423 pixels per inch resolution is obtained from the 1728 CCD element array with increased light gathering capability.

5. The scanner of claim 3, wherein the manual speed of movement of the scanner by a user is limited to a range of 0.1 to 6 inches per second.

6. The scanner of claim 5, wherein the circuit means further comprises means for audible indication of scanner speed conditions of under 0.1 inch per second, over 6 inches per second, or over 12 inches per second.

7. The scanner of claim 5, wherein the circuit means further comprises a first clock generation circuit to reduce the fast scan of the CCD array elements to 8 milliseconds, a dummy slow scan shift clock pulse generator which produces pulses at 8 millisecond intervals, and means to maintain the LED array in a de-energized state, so that when the scanner speed is below 0.1 inches per second, said dummy slow scan shift clock pulse generator is activated to cause the reduced speed fast scan of the CCD array elements with the LED array extinguished, whereby dark current saturation is prevented and high quality scanning and image digitization is assured.

8. The scanner of claim 5, wherein the circuit means further comprises a second clock generation circuit to produce a slow scan shift pulse for every other encoder speed information signal, thereby reducing the slow scan resolution by one-half whenever the scanner speed exceeds 6 inches per second and up to 12 inches per second, and since the fast scan resolution of the CCD array elements is unaffected, this second clock generation circuit provides desired degradation of image acquisition under extreme conditions of scanner acceleration by the user.

9. The scanner of claim 8, wherein the second clock generation circuit causes the slow scan resolution to drop to one-third for scanner speeds in access of 12 inches per second, while the fast scan resolution remains unaffected, thereby continuing to provide the desired degradation of image acquisition under extreme conditions of scanner acceleration by the user.

10. The scanner of claim 5, wherein the window is positioned adjacent the split roller, so that the printed text of pages bound together by a binding may be read in the vicinity of the binding and the printed text in the vicinity of the binding of the opposite page of the bound pages may be read by rotating the scanner so that the split roller is again adjacent the binding.

* * * * *